E. C. STOVER.
APPARATUS FOR TRANSPORTING LIQUIDS OR GASES.
APPLICATION FILED NOV. 13, 1907.

1,053,452.

Patented Feb. 18, 1913.

WITNESSES
R. H. Balderson
W. W. Swartz

INVENTOR
Edward C. Stover,
by Bakewell, Byrnes & Parmelee,
his Attys.

UNITED STATES PATENT OFFICE.

EDWARD C. STOVER, OF TRENTON, NEW JERSEY.

APPARATUS FOR TRANSPORTING LIQUIDS OR GASES.

1,053,452.  Specification of Letters Patent.  Patented Feb. 18, 1913.

Application filed November 13, 1907. Serial No. 401,979.

*To all whom it may concern:*

Be it known that I, EDWARD C. STOVER, of Trenton, Mercer county, New Jersey, have invented a new and useful Improvement in Apparatus for Transporting Liquids or Gases, of which the following is a full, clear, and exact description, reference being had to the accompanying drawings, forming part of this application, in which—

Figure 1:
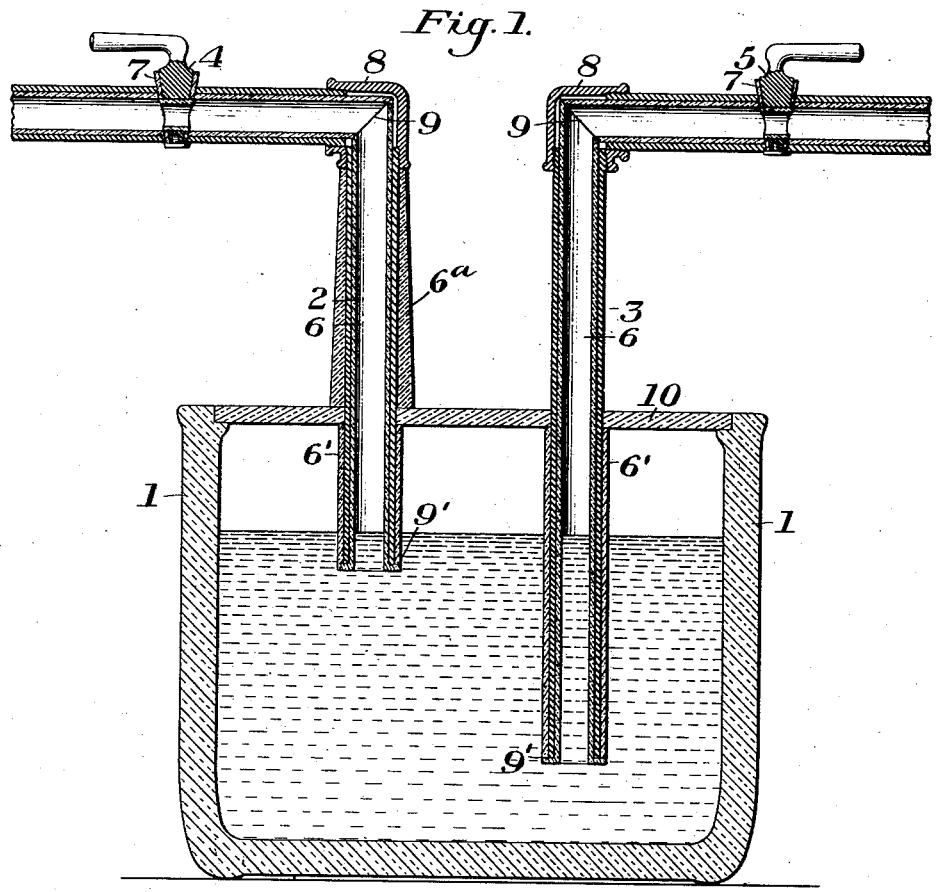
Figure 2:
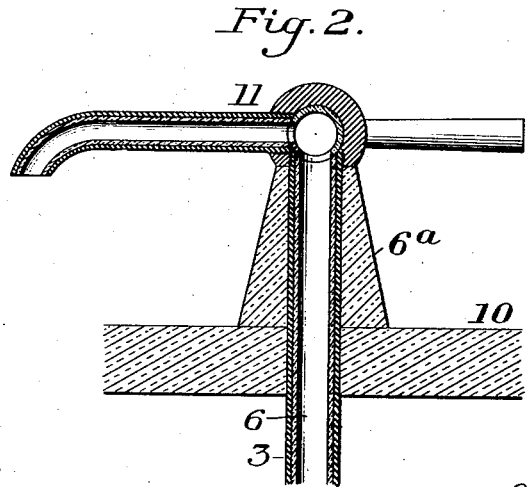

Figure 1 is a vertical section showing apparatus embodying my invention, and Fig. 2 is a detail view hereinafter referred to.

The object of my invention is to provide an apparatus for handling or transporting liquids or gases whether acid, alkaline, or neutral, by means of metal pipes, fittings, joints, valves, faucets, etc., to which are tightly fitted pipes or sheathing of crockery, glass or other non-corrosive material.

In handling of liquids or gases, metal piping is attacked and rendered useless by the action of the liquid or gas and the liquid or gases also become impregnated with the properties of the metal attacked. Crockery or such material while not liable to attack by the majority of liquids or gases, has not sufficient strength of itself to be used without support and a non-corrosive lining or casing blown on or into metal piping does not furnish a sufficiently uniform protection to the pipe because of the presence of bubbles, etc., to make it practicable for such use. To avoid these objections, I employ in my invention metal piping with a casing or lining of crockery, glass or like material which not only preserves the metal pipe from attack by the liquid or gas, but prevents the liquid or gas from becoming impregnated with the properties of the metal pipe.

Referring to the drawings, 1 is a crockery receptacle which may be filled with any liquid or gas from the inlet pipe 2.

3 is an outlet pipe for drawing off the liquid or gas from the receptacle 1.

4 and 5 are valves in the inlet and outlet pipes 2 and 3, respectively. The pipes 2 and 3, which are preferably of metal, are equipped with sheathing or protective piping 6, 6', and the valves 4 and 5 are also equipped with sheathing 7. The joints 8 of the metal pipes 2 and 3 are of ordinary character while the joints at 9, 9' are ground joint connections between the sections 6, 6, or 6', 6' of the sheathing, at which points the separate sections of sheathing are fitted and cemented together.

The sheathing 6', or outside casing of the pipes 2 and 3 is shown as extending only as far as cover or lid 10 of receptacle 1, but it may be extended, where such protection is necessary, as an outside covering over the whole system of the piping, etc., to be used. A faucet 11 may be used to draw off the liquid or gas, equipped with sheathing 6, 6ª, as shown in Fig. 2.

Where liquid is being transported which does not attack the metal piping, only the sheathing 6ª as shown in both Figs. 1 and 2 may be used to prevent the outside of the piping from corroding, and this sheathing may be molded or cast of such a thickness as to not only prevent attack from corrosive substances, but may also act as a support for the piping, etc.

Various modifications may be made in the details of construction and arrangement of my apparatus by those skilled in the art without departing from the spirit and scope of my invention, since

What I claim is:—

1. In apparatus for conveying liquids or gases, the combination of metal piping equipped with distributing means, said piping having its inner surfaces equipped with sheathing adapted to protect said piping from the corrosive action of liquids and gases and its outer surfaces having a covering adapted to prevent corrosion of said surfaces and to act as a support for the piping.

2. In apparatus for conveying liquids or gases, the combination of metal piping equipped with distributing means and having an outer covering of earthy material which acts as a support for the piping.

3. In apparatus for conveying liquids or gases, the combination of metal piping equipped with distributing means and having an outer covering of earthen material, the said covering being adapted to protect the said piping and to support the same.

4. In apparatus for conveying liquids or gases, the combination of sectional metal piping in which the sections are joined together at an angle, distributing means connected with said piping, and protective sectional sheathing having contiguous ends of abutting sections ground to form tight joints inside said metal piping, and entirely removable without unjointing said piping.

In testimony whereof, I have hereunto set my hand.

EDWARD C. STOVER.

Witnesses:
ROBT. S. KEARNEY,
CLARENCE D. KERR.